(12) United States Patent
Easterbrook

(10) Patent No.: US 10,723,175 B2
(45) Date of Patent: Jul. 28, 2020

(54) QUICK ATTACHMENT ARM AND BRACKET FOR SUPPORTING A WHEEL UPON A VEHICLE HOIST

(71) Applicant: David J. Easterbrook, Troy, MI (US)

(72) Inventor: David J. Easterbrook, Troy, MI (US)

(*) Notice: Subject to any disclaimer, the term of this patent is extended or adjusted under 35 U.S.C. 154(b) by 148 days.

(21) Appl. No.: 16/150,553

(22) Filed: Oct. 3, 2018

(65) Prior Publication Data

US 2020/0108660 A1 Apr. 9, 2020

(51) Int. Cl.
*F16M 13/02* (2006.01)
*B60B 30/06* (2006.01)
*B62D 43/00* (2006.01)

(52) U.S. Cl.
CPC ............ *B60B 30/06* (2013.01); *F16M 13/02* (2013.01); *B60B 2900/3313* (2013.01); *B62D 43/002* (2013.01); *F16M 2200/044* (2013.01)

(58) Field of Classification Search
CPC combination set(s) only.
See application file for complete search history.

(56) References Cited

U.S. PATENT DOCUMENTS

| | | | |
|---|---|---|---|
| 1,541,129 A | 6/1925 | Farley | |
| 3,888,354 A | 6/1975 | Margolin et al. | |
| 4,479,625 A | 10/1984 | Martz | |
| 4,658,933 A * | 4/1987 | Cheek | B66F 7/28 187/216 |
| 6,547,197 B2 | 4/2003 | Kempf et al. | |
| 6,604,610 B2 | 8/2003 | Starling et al. | |
| 6,681,897 B2 | 1/2004 | Gibson et al. | |
| 6,752,365 B2 | 6/2004 | Vanech | |
| 6,923,141 B1 | 8/2005 | Staats et al. | |
| 7,073,778 B2 | 7/2006 | Gibson et al. | |
| 7,231,884 B1 | 6/2007 | Rang | |
| 7,815,158 B2 | 10/2010 | Henderson | |
| 7,967,264 B1 * | 6/2011 | Peterson | E06C 7/143 182/115 |
| 8,123,051 B2 * | 2/2012 | Johnson | A47F 7/0021 211/87.01 |
| 8,245,991 B2 | 8/2012 | Hung | |
| 8,684,332 B2 * | 4/2014 | Galla | B66F 13/00 254/10 B |
| 9,302,542 B2 * | 4/2016 | Easterbrook | B60B 30/00 |
| 2002/0003196 A1 | 1/2002 | Gibson et al. | |
| 2003/0155475 A1 | 8/2003 | Hicks | |
| 2009/0067966 A1 | 3/2009 | Hicks | |
| 2012/0079769 A1 | 4/2012 | Krause | |
| 2013/0240696 A1 | 9/2013 | Black et al. | |
| 2014/0035305 A1 * | 2/2014 | Ludwig | B25B 9/00 294/200 |
| 2014/0284441 A1 | 9/2014 | Easterbrook | |
| 2020/0093308 A1 * | 3/2020 | Kroeker | A47G 25/90 |

* cited by examiner

*Primary Examiner* — Monica E Millner
(74) *Attorney, Agent, or Firm* — Dinsmore & Shohl LLP

(57) ABSTRACT

A quick attachment arm is provided for securing to an elevated and structurally supporting location. A multi-sided and compressible pair of bands are constructed of a spring-loaded material attached around a perimeter of a tubular cross section supporting location. A member extends form the band and, at a remote end of the member, an elongated arm is pivotally supported to and extends from the member, the arm adapted to supporting a weighted article placed thereupon.

18 Claims, 5 Drawing Sheets

QUICK ATTACHMENT ARM AND BRACKET FOR SUPPORTING A WHEEL UPON A VEHICLE HOIST

FIELD OF THE INVENTION

The present invention discloses a quick attachment device including an attachment arm and bracket for engagement to a structurally supporting location, such not limited to a tubular location associated with a vehicle hoist. The bracket includes a base attachment portion which is configured as first and second pairs of outwardly spring biasing and compressible bands. First ends of the bands terminate in extending and threaded bolts. Aligning and engaging second ends of the dual bands each include an aperture which, upon compressing the bands against their spring bias, seat through the threaded shafts, following which a nut is exteriorly attached and tightened over the projecting end of each shaft to fasten the bracket to the tubular location.

An elongated member extends from the base attachment portion of the bracket. The attachment arm is pivotally supported to a remote end of the elongated member by a base attachment portion which includes a pair of spaced flanges. A pivotal base portion of the arm is mounted by a pin between the spaced flanges and provides the arm with load supporting capabilities of up to several hundred pounds, thus enabling the placement of heavy objects not limited to a combined weight of a vehicle tire and wheel and such as during repair or maintenance being conducted to the vehicle brakes, axle or the like. A collection cup or other volumetric defining component can be attached to or suspended from the arm and provides a convenient location for depositing and securely retaining lug nuts associated with the removed and supported wheel.

DESCRIPTION OF THE BACKGROUND ART

The prior art is documented with examples of hoist mounted wheel hangers, and such as for hanging a wheel on a hoist arm. Easterbrook U.S. Pat. No. 9,302,542 teaches a quick attachment arm for securing to an elevated and structurally supporting location. A multi-sided and compressible band is constructed of a spring-loaded material. The band is open at its outer end and adapted to permit the band to be attached around a perimeter of the supporting location. An elongated arm is pivotally supported to and extending from the band, the arm adapted to supporting a weighted article placed thereupon.

Henderson, U.S. Pat. No. 7,815,158 teaches a double hinged and hoist mounted wheel hanger including a rigid clevis having top, bottom and base plates arranged in an integral "U" shape and such that a first hinge bolt passes through the top and bottom plates for supporting an arm connector. A second hinge bolt passes through the arm connector and in turn hingedly supports a further extending and pivotally support rod, upon an end of which is exhibited a retainer pin for supporting a wheel and preventing the same from slipping off the arm.

U.S. Pat. No. 6,604,610 to Starling et al. teaches an apparatus for supporting automotive tires having a hanger pin adapted to fit through the mount hole of a vehicle wheel. The apparatus is intended to be installed on an automotive hoist at a height approximately the same as that of a tire of a vehicle disposed on the hoist. A worker removing a wheel from the vehicle disposed on the hoist can thus hang the wheel on the apparatus without significantly bending at the waist.

U.S. Pat. No. 6,681,897 to Gibson teaches an apparatus for supporting automotive tires having a hanger pin adapted to fit through the mount hole of a vehicle wheel. The apparatus is intended to be installed on an automotive hoist at a height approximately the same as that of a tire of a vehicle disposed on the hoist. A worker removing a wheel from the vehicle disposed on the hoist can thus hang the wheel on the apparatus without significantly bending at the waist.

Hicks US 2003/0155475 and US 2009/0067966 each teach a hoist tire hanger with an angled bracket configuration for vertically attaching to a horizontal tubular hoist location and which depicts an upwardly angled tire hanging section. Reference is also made to the pivoting support bracket designs of Gibson US 2002/003196 and the supporting arm of Hung U.S. Pat. No. 8,245,991.

SUMMARY OF THE PRESENT INVENTION

The present invention discloses a quick attachment device for securing to an elevated and structurally supporting location. A bracket portion of the device includes pairs of multi-sided and compressible bands are each of constructed of a spring-loaded material, with each multi-sided band being open at its outer end and adapted to permit the band to be attached around a perimeter of the supporting location.

An extending and threaded bolt is supported upon first end portions of each of the pairs of bands. The other end portions of each of the pairs of bands each further include an aperture which, upon compressing the bands so that an outward bias is counteracted and caused to pivot inwardly, seats the threaded shafts through the aligning apertures. A nut is exteriorly attached and tightened over a projecting end of each of the shafts to draw together and tighten the bands around and against the structurally supporting location.

An elongated member extends from the base attachment portion. The attachment arm is pivotally supported to a remote end of the elongated member by a base attachment portion so that the attachment arm is offset from the base attachment portion and exhibits load supporting capabilities of up to several hundred pounds, thus enabling the placement of heavy objects not limited to a combined weight of a vehicle tire and wheel and such as during repair or maintenance being conducted to the vehicle brakes, axle or the like. A collection cup or other volumetric defining component can be attached to or suspended from the arm and provides a convenient location for depositing and securely retaining lug nuts associated with the removed and supported wheel.

BRIEF DESCRIPTION OF THE DRAWINGS

Reference will now be had to the attached drawings, when read in combination with the following detailed description, wherein like reference numerals refer to like parts throughout the several views, and in which.

DETAILED DESCRIPTION OF THE PREFERRED EMBODIMENTS

Figure 1:
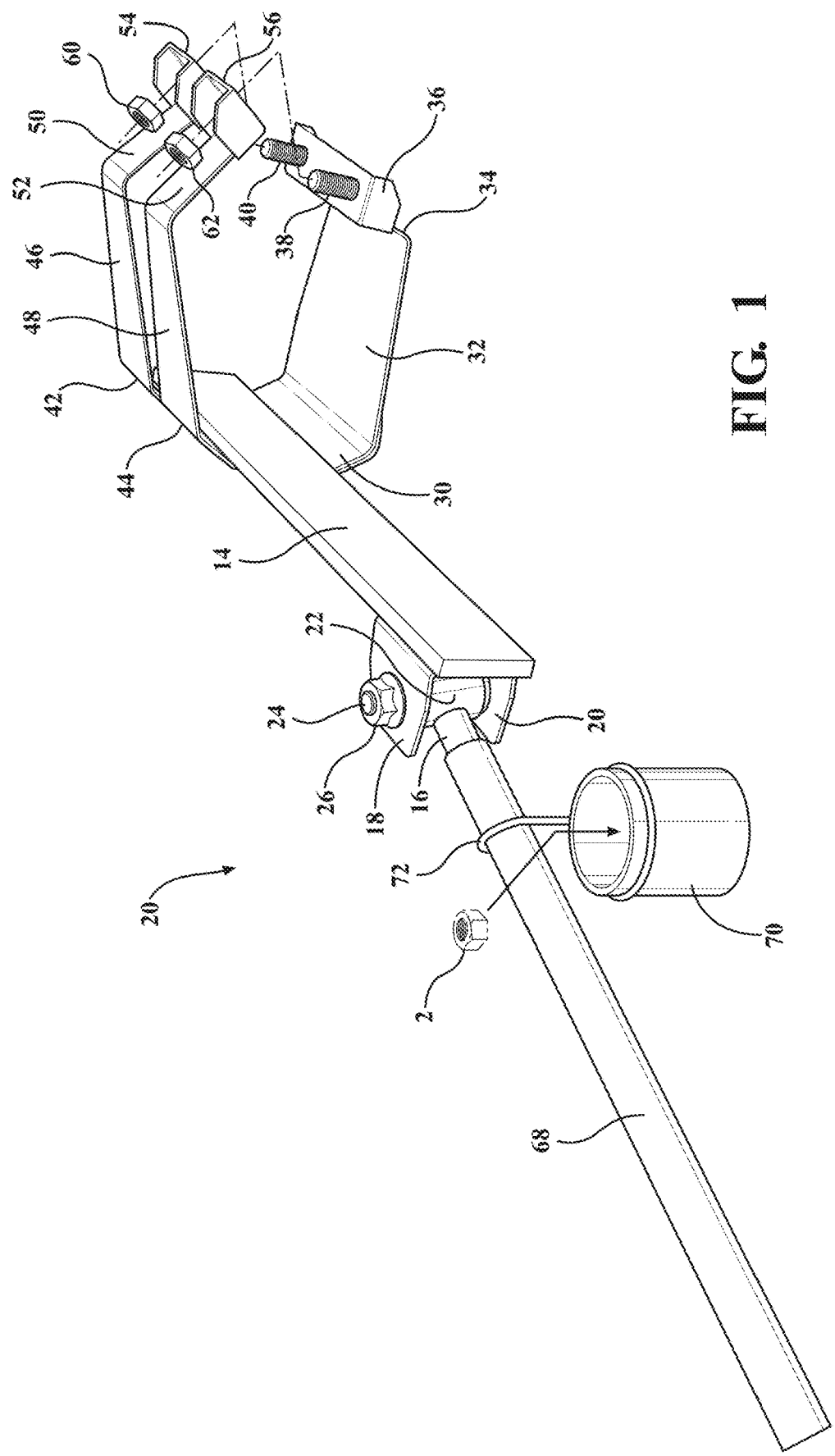
FIG. 1 is a first perspective view of the load bearing and spring loaded quick attachment device according to one non-limiting variant of the present invention and illustrating the spring loaded attachment bands in a first open position.

Referring to FIG. 1, an attachment device is generally depicted at 10 for engagement to a structurally supporting location, such as not limited to a tubular location (not shown) associated with a vehicle hoist. As will be further described, the bracket and associated attachment arm is capable of being redesigned in a number of differing and unlimited configurations and for providing load bearing support to objects placed thereupon, such as again including but not limited to support a tire from its inner rim or wheel location.

The attachment device, including the spring loaded bracket and remaining components, can further be constructed from a number of materials including, in one embodiment, a heavy duty spring steel material providing the necessary load bearing and resilient properties. It is understood that the bracket can also be constructed of other materials not limited to composite metals, and resilient polymer or polymer composites.

A bracket is shown and includes pairs of compressible and spring loaded bands. In the non-limiting illustrated embodiment, a base portion 12 of the bracket (see FIG. 5) affixes and anchors an elongated member or plate 14. An arm 16 is pivotally supported to a remote end of the elongated plate 14 via a pair of mounting flanges 18 and 20 extending from the plate 14.

Figure 2:
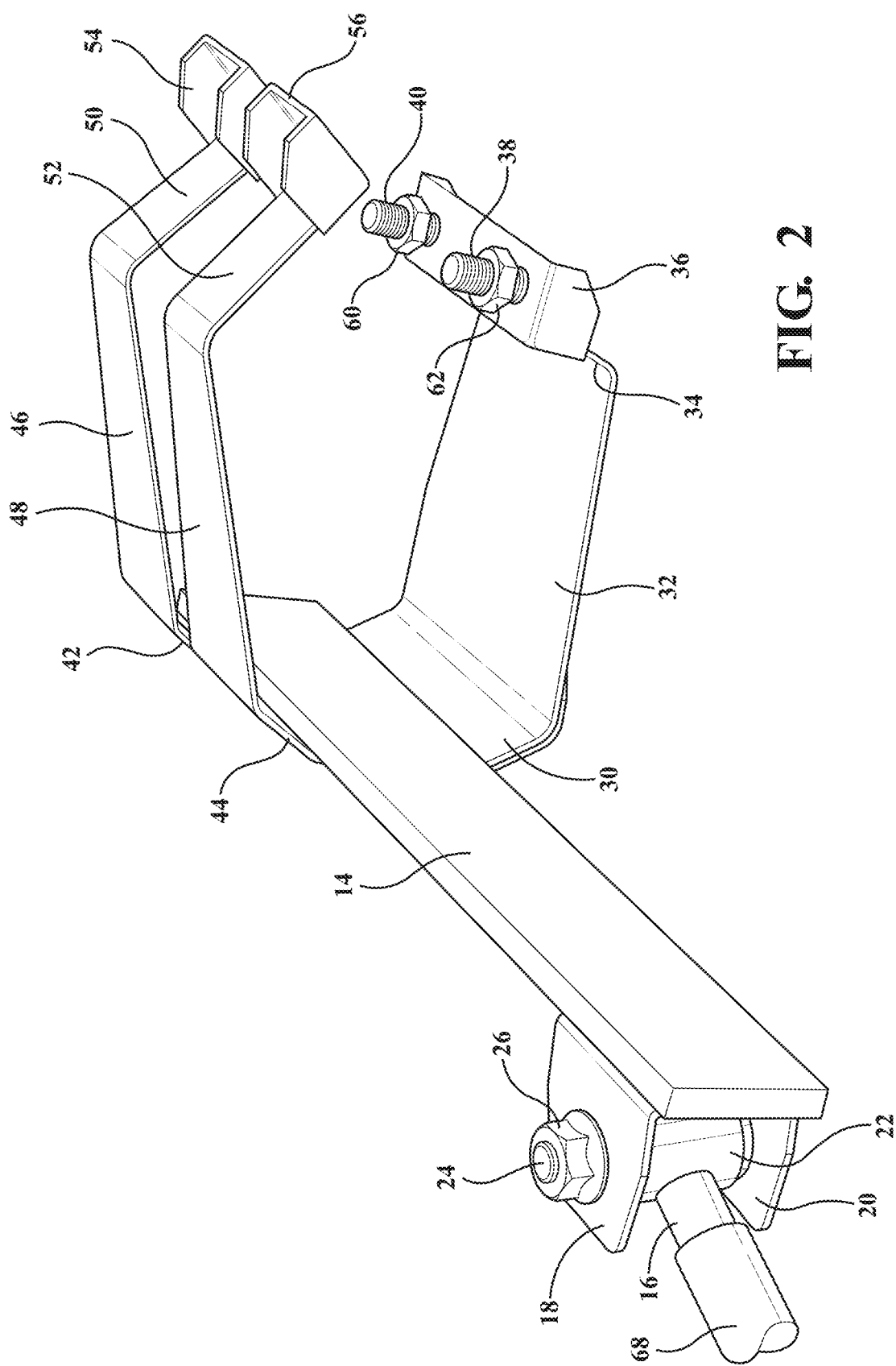
FIG. 2 is an enlarged partial perspective of FIG. 1 and better illustrating the features of the elongated member or plate for displacing the pivotal supporting end of the arm from the base portion of the spring loaded/compressible bands.

A reinforced cylindrical support body 22 (this forming an integrated proximal end of the arm 16), is seated in cross wise extending fashion between the mounting flanges 18/20. A heavy duty pivotal support fastener includes a threaded shaft, see end 24, which extends through an interior of the cylindrical support body 22 and between the mounting flanges 18/20. For purposes of the present illustration, a first threaded attachment nut 26 is depicted in each of FIGS. 1, 2 and 5 engaged to an end portion of the shaft 24 projecting beyond an exterior surface of flange 18.

Figure 4:
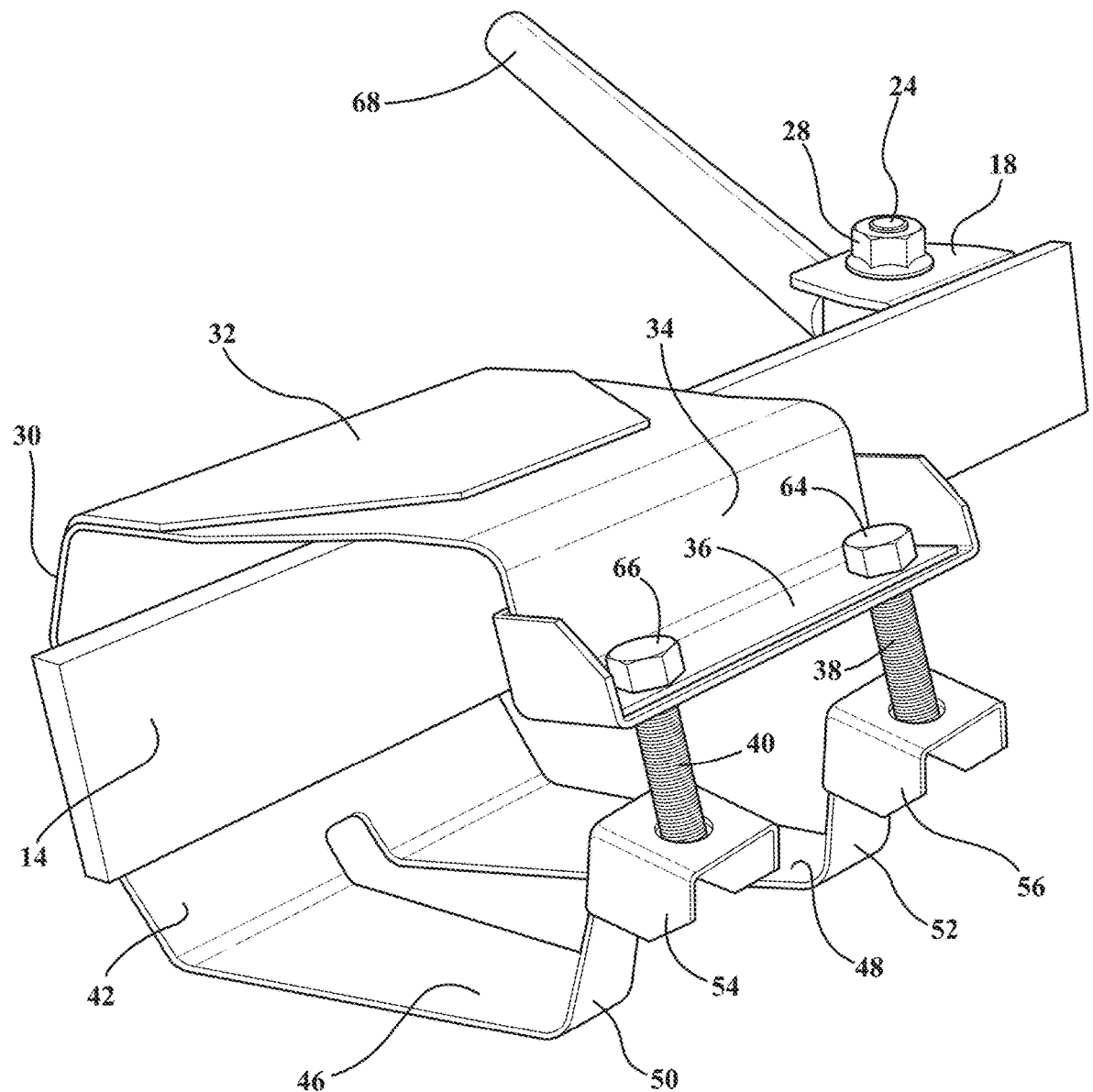
FIG. 4 is a rotated view of the quick attachment device from FIG. 3 and illustrating the offset nature of the wheel supporting arm relative to the base surface of the base attachment portion of the bracket.

A second threaded attachment nut 28 is depicted in the rotated illustration of FIG. 4 located on an exterior surface of flange 20. Either of the first or second nuts 26/28 can be reconfigured as a fixed enlarged head of the fastener which integrates the threaded shaft 24. As further shown, each of the nuts can also integrate an enlarged skirt portion or a separate washer (not shown) can be provided.

In this fashion, the attachment arm 16 is pivotally supported at a remote extending end of the elongate member or plate 14, such that the arm can exhibit load supporting capabilities of up to several hundred pounds, thus enabling the placement of heavy objects (not shown) such as including, but not limited to, a combined weight of a vehicle tire and wheel such as during repair or maintenance being conducted to the vehicle brakes, axle or the like.

Figure 5:
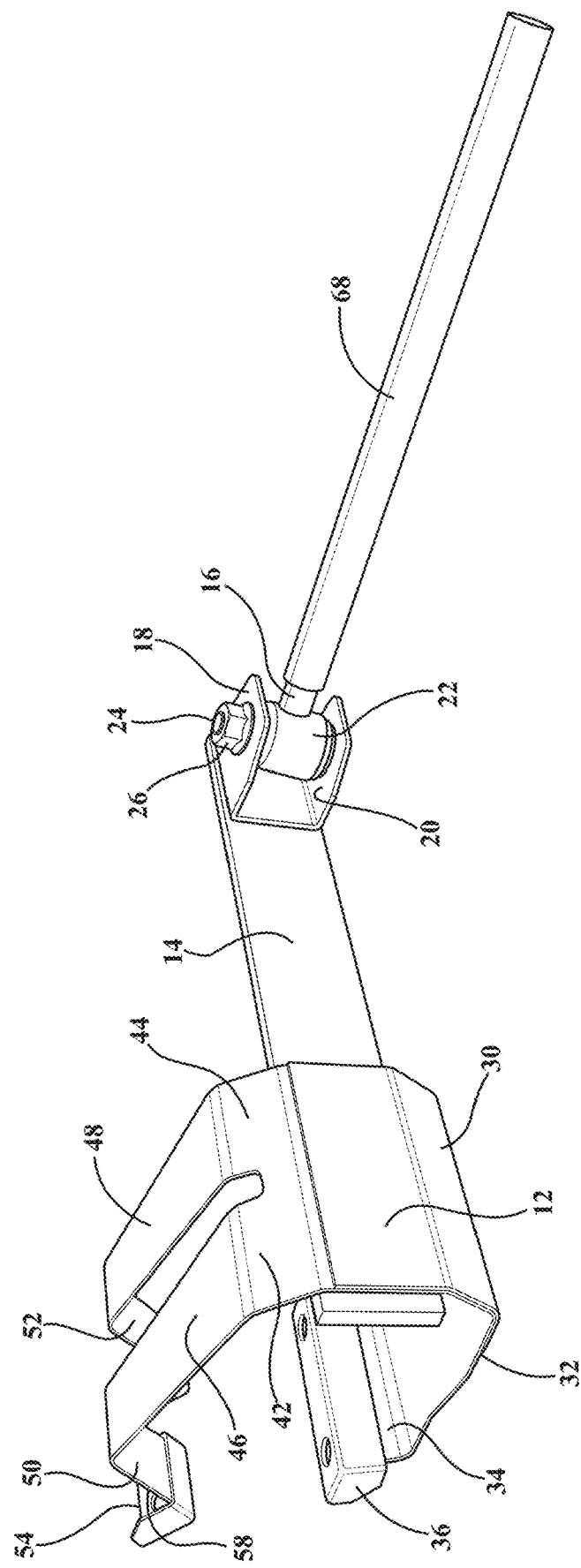
FIG. 5 is a further perspective view illustrating in particular the configuration and dimension of the elongated and pivotal load supporting arm supported at an offset pivotal location, via the extending member associated with the base surface of the spring loaded bracket attachment bands.

The spring loaded arms associated with the bracket include a lower plate shaped member having a series of angled sides 30, 32 and 34 extending from the common base portion 12 (FIG. 5). A support portion 36 is mounted in extending fashion along a remote edge of angled side 34 and in turn supports a pair of threaded bolts 38 and 40 in generally upwardly extending fashion. It is further envisioned that the lower plate shaped member can be separated into individual spring loaded arms.

A pair of upper spring-loaded members are further provided extending from an opposite side of the base support surface 12 and include respective interconnecting and spaced apart members with corresponding sides 42/44, 46/48 and 50/52, these extending in branching fashion from the common support surface 12 (again best shown in FIG. 5). Each of the outermost angled and spaced apart sides 50/52 terminate in individual support locations 54 and 56 having a planar surface opposing the threaded fasteners 38 and 40 and through which is formed a receiving aperture (one of these partially visible at 58 in FIG. 5).

The opposing pairs of biasing and compressible bands in the open position (FIGS. 1, 2 and 5) provide sufficient clearance between the opposing support locations (at 36 and individual opposing at 50/52) to permit the bracket to be positioned around a tubular mounting location, such as associated with a conventional vehicle lift. Upon locating the bracket, the pairs of spring loaded bands (defined as each of branch extending portions 42/46/50 and 44/48/52 and common opposing portion 30/32/34) are compressed so that their associated support locations 54/56 and 36 are caused to displace toward one another.

Figure 3:
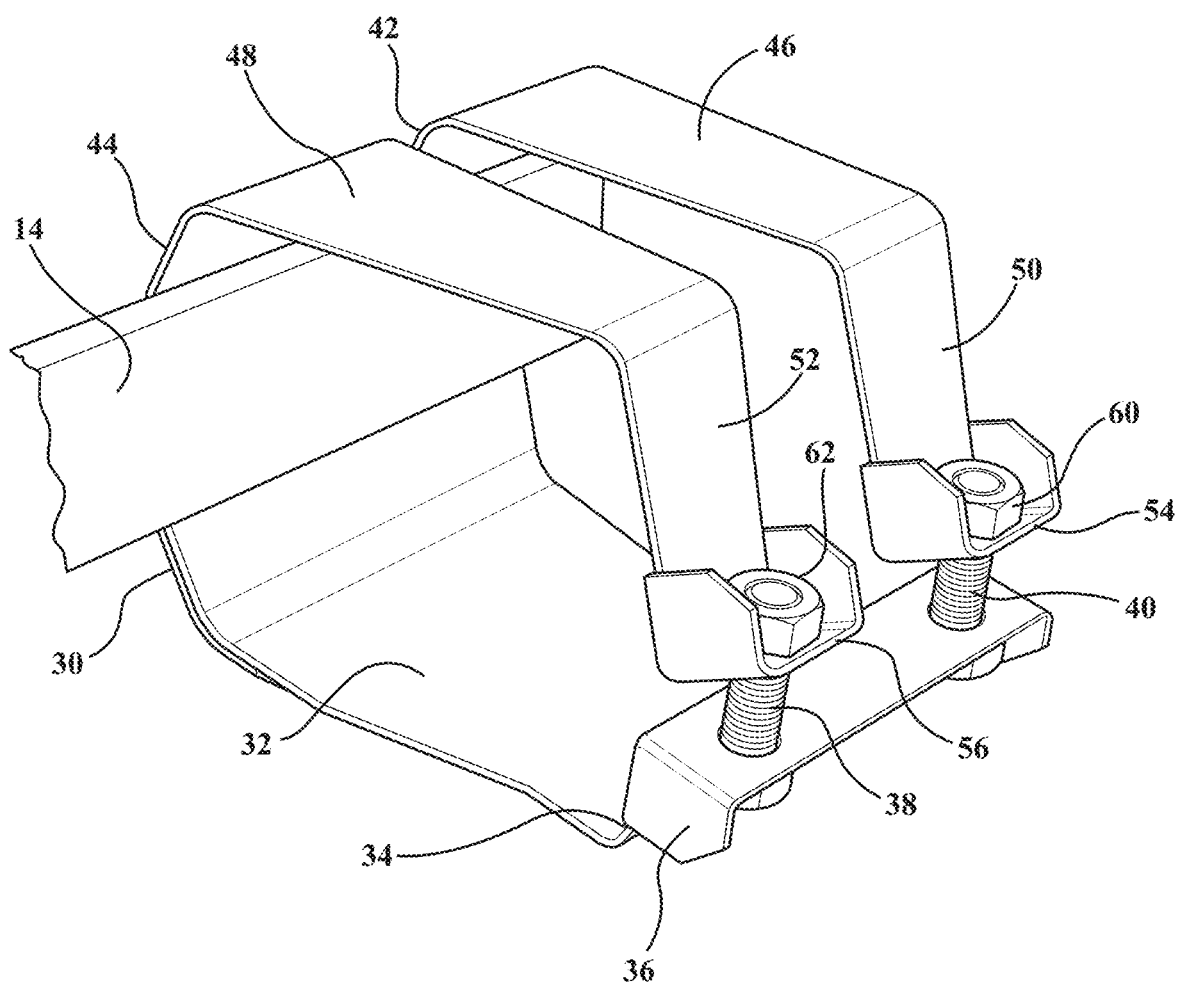
FIG. 3 is a succeeding illustration to FIG. 2 and depicting an intermediate installation position the compressing of the pairs of bands against their outward spring bias, and including projecting threaded shafts from first extending ends seating through apertures configured in opposing and aligning second extending ends, following which a nut is exteriorly attached over the projecting end of each shaft prior to being progressively tightened in order to fixedly secure the bands to the tubular member being encircled.

At this point, the ends of the threaded bolts 38 and 40 seat through the individual apertures in the individual support locations 54/56 and, following this, a pair of threaded nuts 60 and 62 are attached (FIG. 3) and progressively tightened to clamp the bracket about the tubular frame location of the vehicle lift in counteracting fashion to the outward bias exerted by the opposing bands. The nuts 60/62 can be stored in the bracket open (non-attached) position directly upon the threaded bolts (see FIG. 2) and, as further shown in FIG. 4, the opposite ends of the bolts 38/40 include enlarged heads 64/66 abutting an exterior face of the common mounting support location 36.

In this manner, the bracket defines a pair of multi-sided bands which are open at their outer end and are adapted to permit the band to be biasingly or flexurally attached around a perimeter location (again not shown) associated with the vehicle lift frame. While again not limited to any specific material construction or dimensions it is understood that the band, such as constructed of a heavy duty spring steel or like material, and which exhibit a suitable length, width and thickness in order to engage around and subsequently draw down against a lift frame location such as which can exhibit a 4.25"×4.25" standard cross section. It is also envisioned and understood that the spring loaded band or clamp can be redesigned to exhibit any other integrally extending configuration which facilitates quick attach/detach capabilities relative to the vehicle lift or like supporting surface.

Additional features include a nylon sleeve 68 which can be placed over the underlying (metal) arm 16 and in order to facilitate such as smooth sliding placement and removal of the wheel via its inner rim. As further depicted in FIG. 1, a collection cup 70 or other volumetric defining component can be attached to or suspended from the arm 16 as further referenced by an upwardly extending and looped clip engaging arm 72 to provide a convenient location for depositing and securely retaining lug nuts (at 2) associated with the removed and supported wheel (not shown).

Having described my invention, other and additional preferred embodiments will become apparent to those skilled in the art to which it pertains, and without deviating from the scope of the appended claims.

I claim:

1. A quick attachment device for securing to an elevated and structurally supporting location, comprising:
   a bracket including a pair of multi-sided and compressible bands each constructed of a spring-loaded material, the bands being open at opposing outer ends and adapted to being positioned around and subsequently tightened against a perimeter of the structurally supporting location;
   an elongated member extending from a base surface of said bracket;
   at least one flange extending from said elongated member a spaced distance from said compressible bands; and
   an arm pivotally supported to said flange at an extended end of said elongated member spaced from said bracket, said arm adapted to support a weighted article placed thereupon while supported upon the structural location.

2. The invention as described in claim 1, said pair of bands further comprising:
   a first extending side including a plate shaped portion with first, second and third angled sides terminating in a common support portion to which are secured a pair of bolts;
   a second extending side including a pair of branching portions with individual first, second and third angled sides terminating in individual support portions, the individual support portions having through apertures aligning with and receiving threaded ends of said bolts extending from said common support portion; and
   a pair of nuts attaching to said threaded ends and being tightened to draw said common support portion and said opposing individual support portions towards one another around the elevated structurally supporting location.

3. The invention as described in claim 1, said at least one flange further comprising a pair of flanges extending from said elongated member, a reinforced cylindrical support body defining a pivotal mounting end of said arm being seated in cross wise extending fashion between said mounting flanges, a heavy duty mounting fastener includes a threaded shaft extending within said cylindrical support body and through aligning apertures in said flanges.

4. The invention as described in claim 3, further comprising at least one nut attached over a projecting end of said mounting fastener for tightening against a selected one of said flanges.

5. The invention as described in claim 1, further comprising a nylon sleeve placed over said arm to facilitate such as smooth sliding placement and removal of the weighted article.

6. The invention as described in claim 1, further comprising a volumetric defining and cup shaped component attached to or suspended from said arm to provide for depositing and securely retaining lug nuts associated with a weighted article in the form of a removed and supported wheel.

7. The invention as described in claim 1, said elongated member exhibiting a flattened plate shaped member.

8. The invention as described in claim 1, further comprising said bracket being constructed of a spring steel material.

9. A quick attachment device for securing to an elevated and structurally supporting location, comprising:
   a bracket including a pair of multi-sided and compressible bands each constructed of a spring-loaded material, the bands being open at opposing outer ends and adapted to being positioned around and subsequently tightened against a perimeter of the structurally supporting location;
   said pair of bands further including:
      a first extending side including a plate shaped portion with first, second and third angled sides terminating in a common support portion to which are secured a pair of bolts;
      a second extending side including a pair of branching portions with individual first, second and third angled sides terminating in individual support portions, the individual support portions having through apertures aligning with and receiving threaded ends of said bolts extending from said common support portion; and
      a pair of nuts attaching to said threaded ends and being tightened to draw said common support portion and said opposing individual support portions towards one another around the elevated structurally supporting location;
   an elongated member extending from a base surface of said bracket; and
   an arm pivotally supported to at an extended end of said elongated member spaced from said bracket, said arm adapted to support a weighted article placed thereupon while supported upon the structural location.

10. The invention as described in claim 9, further comprising a pair of flanges extending from said elongated member, a reinforced cylindrical support body defining a pivotal mounting end of said arm being seated in cross wise extending fashion between said mounting flanges, a heavy duty mounting fastener includes a threaded shaft extending within said cylindrical support body and through aligning apertures in said flanges.

11. The invention as described in claim 10, further comprising at least one nut attached over a projecting end of said mounting fastener for tightening against a selected one of said flanges.

12. The invention as described in claim 9, further comprising a nylon sleeve placed over said arm to facilitate such as smooth sliding placement and removal of the weighted article.

13. The invention as described in claim 9, further comprising a volumetric defining and cup shaped component attached to or suspended from said arm to provide for depositing and securely retaining lug nuts associated with a weighted article in the form of a removed and supported wheel.

14. The invention as described in claim 9, said elongated member exhibiting a flattened plate shaped member.

15. The invention as described in claim 9, further comprising said bracket being constructed of a spring steel material.

16. A quick attachment device for securing to an elevated and structurally supporting location, comprising:
   a bracket including a pair of multi-sided and compressible bands each constructed of a spring-loaded material, the bands being open at opposing outer ends and adapted to being positioned around and subsequently tightened against a perimeter of the structurally supporting location;

an elongated member extending from a base surface of said bracket;

a pair of flanges extending from said elongated member, a reinforced cylindrical support body defining a pivotal mounting end of an arm being seated in cross wise extending fashion between said mounting flanges, a heavy duty mounting fastener includes a threaded shaft extending within said cylindrical support body and through aligning apertures in said flanges; and said arm pivotally supported to at an extended end of said elongated member spaced from said bracket, said arm adapted to support a weighted article placed thereupon while supported upon the structural location.

17. The invention as described in claim 16, said pair of bands further comprising:

a first extending side including a plate shaped portion with first, second and third angled sides terminating in a common support portion to which are secured a pair of bolts;

a second extending side including a pair of branching portions with individual first, second and third angled sides terminating in individual support portions, the individual support portions having through apertures aligning with and receiving threaded ends of said bolts extending from said common support portion; and a pair of nuts attaching to said threaded ends and being tightened to draw said common support portion and said opposing individual support portions towards one another around the elevated structurally supporting location.

18. The invention as described in claim 16, said elongated member exhibiting a flattened plate shaped member.

* * * * *